United States Patent [19]

Nishino et al.

[11] Patent Number: 5,004,895
[45] Date of Patent: Apr. 2, 1991

[54] HEATER DEVICE USED FOR FLOOR MATERIAL ETC. AND FLOOR MATERIAL WITH HEATER CONTAINED THEREIN

[75] Inventors: Yoshinori Nishino, Yamatotakada; Junjiro Kishigami, Osaka, both of Japan

[73] Assignee: Nippon Basic Technology Laboratory Co., Ltd., Japan

[21] Appl. No.: 376,818

[22] Filed: Jul. 7, 1989

[30] Foreign Application Priority Data

| Jul. 8, 1988 | [JP] | Japan | 63-90665[U] |
| Jul. 8, 1988 | [JP] | Japan | 63-90669[U] |
| Nov. 14, 1988 | [JP] | Japan | 63-148172[U] |

[51] Int. Cl.$^5$ ............................................. H05B 3/36
[52] U.S. Cl. .................................... 219/528; 338/212
[58] Field of Search .............. 219/548, 528, 549, 541, 219/543, 544, 212, 529; 338/211, 212, 217, 308, 309

[56] References Cited

U.S. PATENT DOCUMENTS

| 3,417,229 | 12/1968 | Shomphe | 219/528 |
| 4,158,078 | 6/1979 | Egger | 219/528 |
| 4,656,339 | 4/1987 | Grise | 219/528 |

Primary Examiner—Roy N. Envall, Jr.
Attorney, Agent, or Firm—Barnes, Kisselle, Raisch, Choate, Whittemore & Hulbert

[57] ABSTRACT

The present invention relates to a heater device used for a floow material with a heater contained therein and the like within a room and a floor material with a heater contained therein, said heater device comprising an insulating sheet, a plurality of belt-shaped electrodes stood in a row side by side at intervals on an upper surface of said insulating sheet, a plastic radiant body layer formed on an upper surface of the insulating sheet and said belt-shaped electrodes and an insulating layer formed on an upper surface of said radiant body layer, and said floor material with a heater contained therein comprising a bed plate, a first resin layer formed on said bed plate, a pair of belt-shaped electrodes provided at an interval on said first resin layer, a radiant body layer formed on an upper surface of said first resin layer and the belt-shaped electrodes, a second resin layer formed on an upper surface of said radiant body layer and a dressed sheet provided on an upper surface of said second resin layer.

The floor material and the like using such the heater device can be uniformly heated all over the surface thereof and the breakage of the heater portion is not produced even though it is cut.

7 Claims, 8 Drawing Sheets

HEATER DEVICE USED FOR FLOOR MATERIAL ETC. AND FLOOR MATERIAL WITH HEATER CONTAINED THEREIN

FIELD OF THE INVENTION

The present invention relates to a heater device used for indoor floor materials with a heater contained therein and the like and floor materials with a heater contained therein used for indoor floors.

BACKGROUND OF THE INVENTION

The conventional floor material with a heater contained therein, as described later with reference to the drawings, comprises for example a plywood, on which a light weight cement layer is formed, a heater wire meanderingly arranged on said light weight cement layer, a metallic plate laminated on said plywood and a dressed sheet laminated on said metallic plate, both end of said heater wire being connected to an electrode. Such the floor materials with a heater contained therein are stood in a row by putting convex portions formed in an edge portion of one floor material in concave portions formed in an edge portion of another floor material and placed on floor joints fixedly mounted on support woods by means of nails and the like.

The floor materials with a heater contained therein having such the conventional construction are stored under the condition that the plywood, the dessed sheet and the like are unificated, so that many kinds of floor materials must be prepared depending upon the kind of dressed sheets, the change in total thickness, the change in area and the like. This is economically disadvatageous and can not meet an order for a large quantity of products of single kind.

In addition, with the above described conventional construction, a problem occurs in that merely the circumference of the heater wire, which is meanderingly arranged, is heated, that is, the local heating is brought about to produce the low temperature burn. Furthermore, the heating operation can not be expected by the breakage of merely one place of the heater wire. Accordingly, such floor materials can not be used for the heating when they are cut for the adjustment to an indoor size. In addition, in order to obtain a sufficient heat insulating temperature, the corresponding high electric current is required. That is to say, a problem occurs also in that when a weak point exists in a heating portion such as heater wire, the heating portion is broken to make an arc due to a short-circuit thereby firing.

Besides, with the above described conventional construction, the floor material with a heater contained therein is heated by electrifying the heater wire but the plywood is dried with the lapse of time when it is used to produce the shrinkage thereby producing a gap between it and the floor joints or gaps between the concave portions and the convex portions. As a result, the creak is generated when persons walk on the floor materials. In addition, the edge portion of the dressed sheet is gotten turned up due to the shrinkage to lead to the possibility that persons' feet are caught by the edge portion of the dressed sheet to injure the persons.

DISCLOSURE OF THE INVENTION

It is an object of the present invention to provide a heater device capable of storing merely a heater portion and forming a floor material with a heater contained therein and . the like by connecting a bed plate and a dressed sheet thereto in compliance with the order.

It is another object of the present invention to provide a floor material with a heater contained therein capable of uniformly heating all over the surface thereof and not breaking a heater portion even if it is cut.

It is a further object of the present invention to provide a floor material with a heater contained therein capable of always smoothly and surely flowing an electric current therethrough and achieving a sufficient heat insulating effect even by a low electric current.

It is a still further object of the present invention to provide a floor material with a heater contained therein capable of maintaining aqueous ingredients for a long time without drying a bed plate.

It is an also still further object of the pre sent invention to provide a heating device used as a chair and a desk having a heating function, a household heating box for drying tablewares and storing foodstuffs, a sauna, a drier for the washings and the like, a table device capable of heat insulting foodstuffs on a table and the like by the use of said heater device.

In order to achieve the above described objects, a heater device according to the present invention comprises, an insulting sheet, a plurality of belt-shaped electrodes arranged on said insulating sheet side by side at intervals, a plastic radiant body layer formed on the insulating sheet and said belt-shaped electrodes, and an insulating layer formed on said radiant body layer.

With such the construction according to the present invention, for example when an order is made for a floor material with a heater contained therein, the floor material can be shipped by adhering the heater de vice to the bed plate in compliance with the order via the insulating sheet and adhering a dressed sheet in compliance with the order to the insulating layer of the heater device. In addition, a area in compliance with the order can be given to &he heater device by cutting between the belt-shaped electrodes and further cutting in the direction meeting at right angles with the direction of length of the belt-shaped electrodes.

Next, the floor material with a heater contained therein according to the present invention comprises, a bed plate, a first resin layer formed on said bed plate, a pair of belt-shaped electrodes provided on said resin layer with an interval therebetween, a radiant body layer formed said first resin layer and belt-shaped electrodes, a second resin layer formed on said radiant body layer, and a dressed sheet provided on said second resin layer.

With such the construction according to the present invention, when a voltage is applied between the belt-shaped electrodes, an electric current is flown all over the range of the radiant body layer to uniformly heat all over the surface of the floor material. In addition, even if an electric current is not flown at merely one place, the greater part of the residual range is electrified to generate a heat.

In addition, according to another construction of the present invention, the floor material with a heater contained therein comprises, a bed plate formed by laminating a plurality of wooden single plates via a piece of far infrared ray reflecting plate interposed between said wooden single plates, a plate type heater device capable of radiating far-infrared rays, disposed on said bed plate and having a radiant body layer, and a dressed sheet provided on said heater device.

With such the construction according to the present invention, when a voltage is applied to the heater device, all over the range of the heater device is electrified to generate a heat thereby uniformly heating all over the surface of the floor material. In addition, the heater device radiates a far-infrared energy in addition to said thermal energy. Far infrared rays radiated from an upper surface side are transmitted through the dressed sheet (the dressed sheet and resin layer in &he case where the resin layer for radiating far-infrared rays is provided, as mentioned later in preferred embodiments) and then radiated in a room. In addition, far-infrared rays radiated from a lower surface side are reflected by the reflecting plate and then transmitted through the dressed sheet, the resin layer and the like (the promotion of the radiation of far infrared rays by the resin layer radiating far-infrared rays is called the transmission) followed by being radiated in the room. Thus, the great part of far-infrared rays from the heater device are radiated in the room. In addition, with the floor material having the plate type heater device, even if for example an electric current is not flown at some places, the great part of residual range is electrified to generate a heat. Besides, also when it is out to the desired size, a heat is generated without any hindrances.

Other objects and constructions of the present invention other than the above described objects and constructions are made clear with reference to the drawings and preferred embodiments which are mentioned below.

BRIEF DESCRIPTION OF THE DRAWINGS

The preferred embodiments of the present invention are shown in FIGS. 1 to 12, in which.

Figure 13:
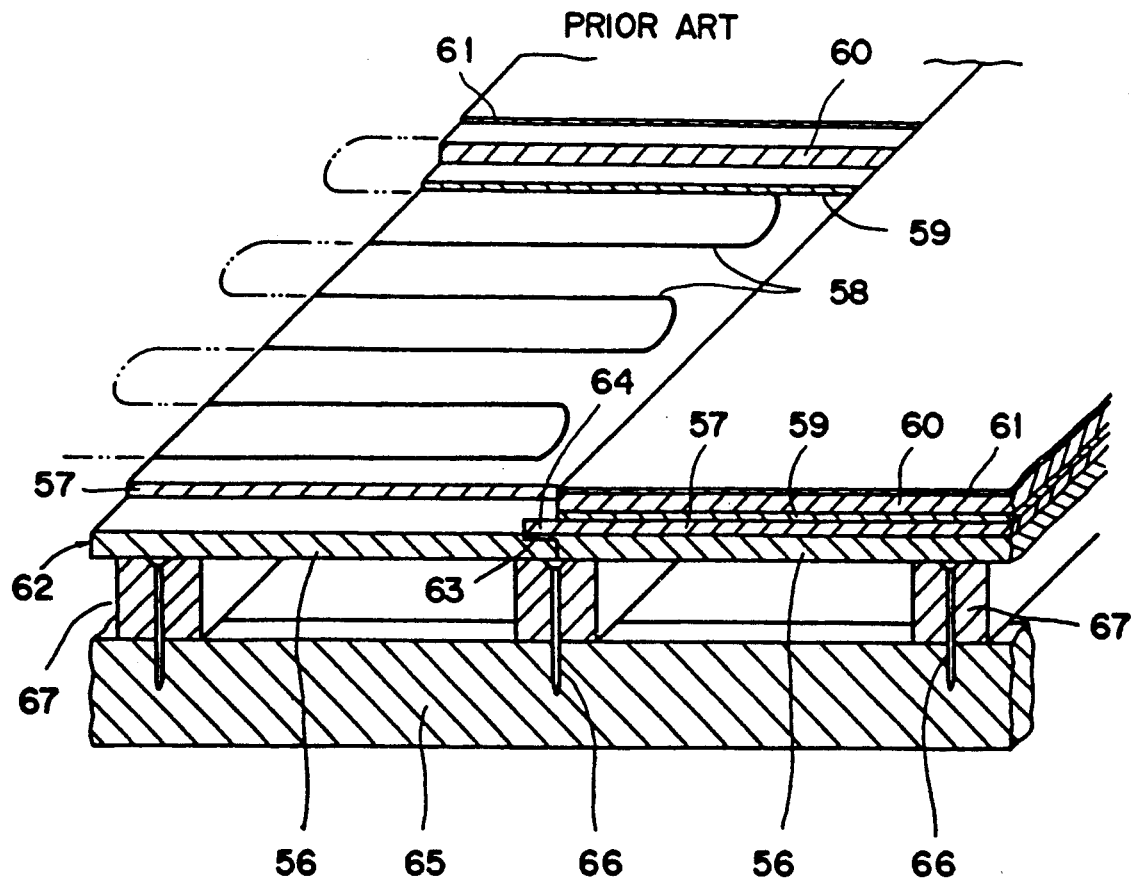

And, FIG. 13 is a perspective view showing the conventional floor material under the condition that it is partially gotten turned up.

DESCRIPTION OF THE PREFERRED EMBODIMENTS

At first, the conventional example of floor material is described with reference to the drawings prior to the description of the preferred embodiments of the present invention.

A floor material with a heater contained therein having a construction shown in for example FIG. 13 has been provided. That is to say, a floor material 62 with a heater contained therein is produced by forming a light weight cement layer 57 on a plywood 56, meanderingly providing a heater wire 58 on said light weigh&cement layer 57, connecting both ends of said heater wire 68 to an electrode, laminating a metallic plate 59 on a plywood 60, and then laminating a dressed plate 61 on said metallic plate 59. Such the floor materials 62 with a heater contained therein are stood in a row by putting convex portions 64 formed in an edge portion of one floor material in concave portions 63 formed in an edge portion of another floor material and placed on floor joints 67 fixedly mounted on support woods 65 by means of nails 66 and the like.

However, with the above described conventional construction, various kinds of problem have occurred and thus been unsatisfactory, as above described.

The preferred embodiments of the present invention will be below described with reference to FIGS. 1 to 12.

Figure 1:
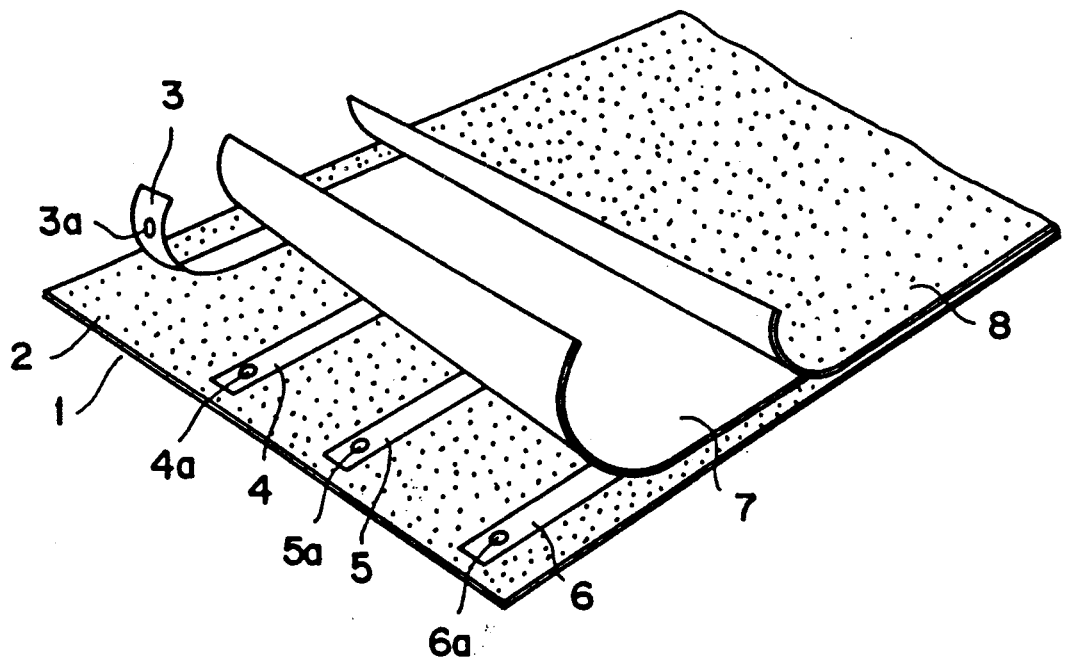
FIG. 1 is a perspective view showing a heater device under the condition that it is partially gotten turned up.
Figure 2:
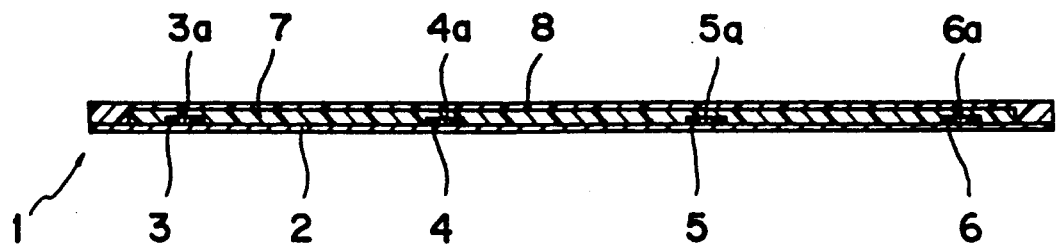
FIG. 2 is a longitudinal sectional view.

Referring now to FIGS. 1 and 2, reference numeral 1 designates a heater device comprising an insulating sheet 2 formed of resin-impregnated paper, plastic film and the like, a plurality of (four in the preferred embodiment) belt-shaped electrodes 3, 4, 6, 6 disposed on said insulating sheet 2 side by side at intervals, a plastic radiant body layer 7 formed on said belt-shaped electrodes 3, 4, 5, 6 and an upper surface of the insulating sheet 2 and an insulating layer 8 formed on said radiant body layer 7.

Said belt-shaped electrodes 3, 4, 5, 6 are formed of copper and provided with a hole 3a, 4a, 5a, 6a formed at an end portion thereof. Said holes 3a, 4a, 5a, 6a may be formed when a lead wire is connected (which will be mentioned later). Said plastic radiant body layer 7 is formed of a film made of a mixture comprising for example granular and powdery carbon, granular and powdery electrically conductive ores, granular and powdery semiconductive ceramics and resins. In addition, said insulating layer 8 is made of for example thermosetting resins such as epoxy resins. And, the radiant body layer 7 and the insulating layer 8 are laminated by coating by means of for example a roller.

Figure 3A:
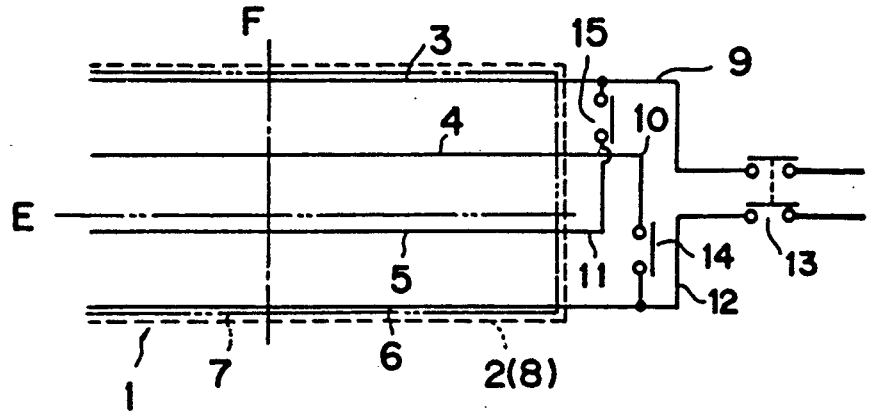
FIG. 3(A) to 3(D) is a diagram showing an operation.
Figure 3B:
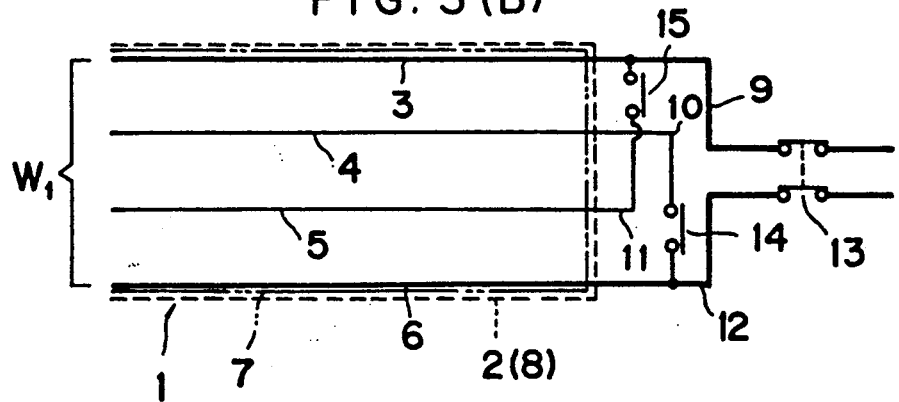
Figure 3C:
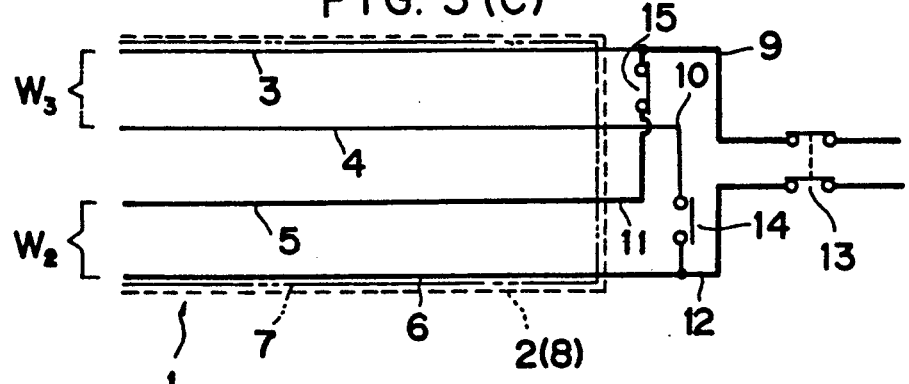
Figure 3D:
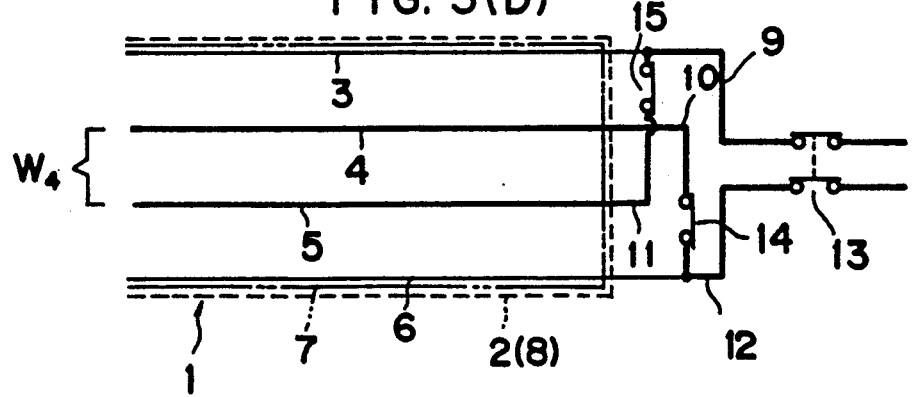
Figure 4:
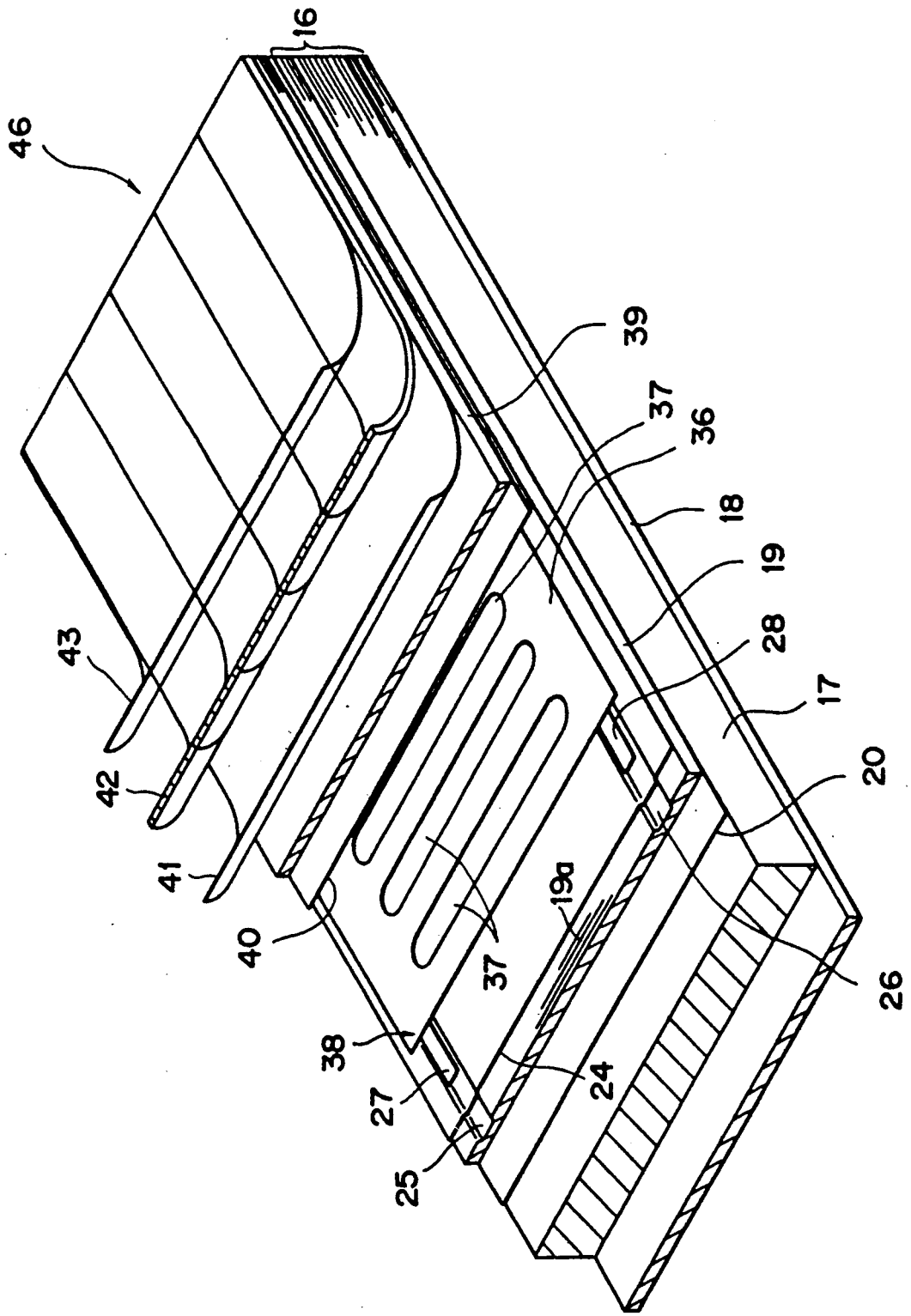
FIG. 4 is a perspective view showing a floor material with a heater contained therein under the condition that it is partially gotten turned up.
Figure 5:
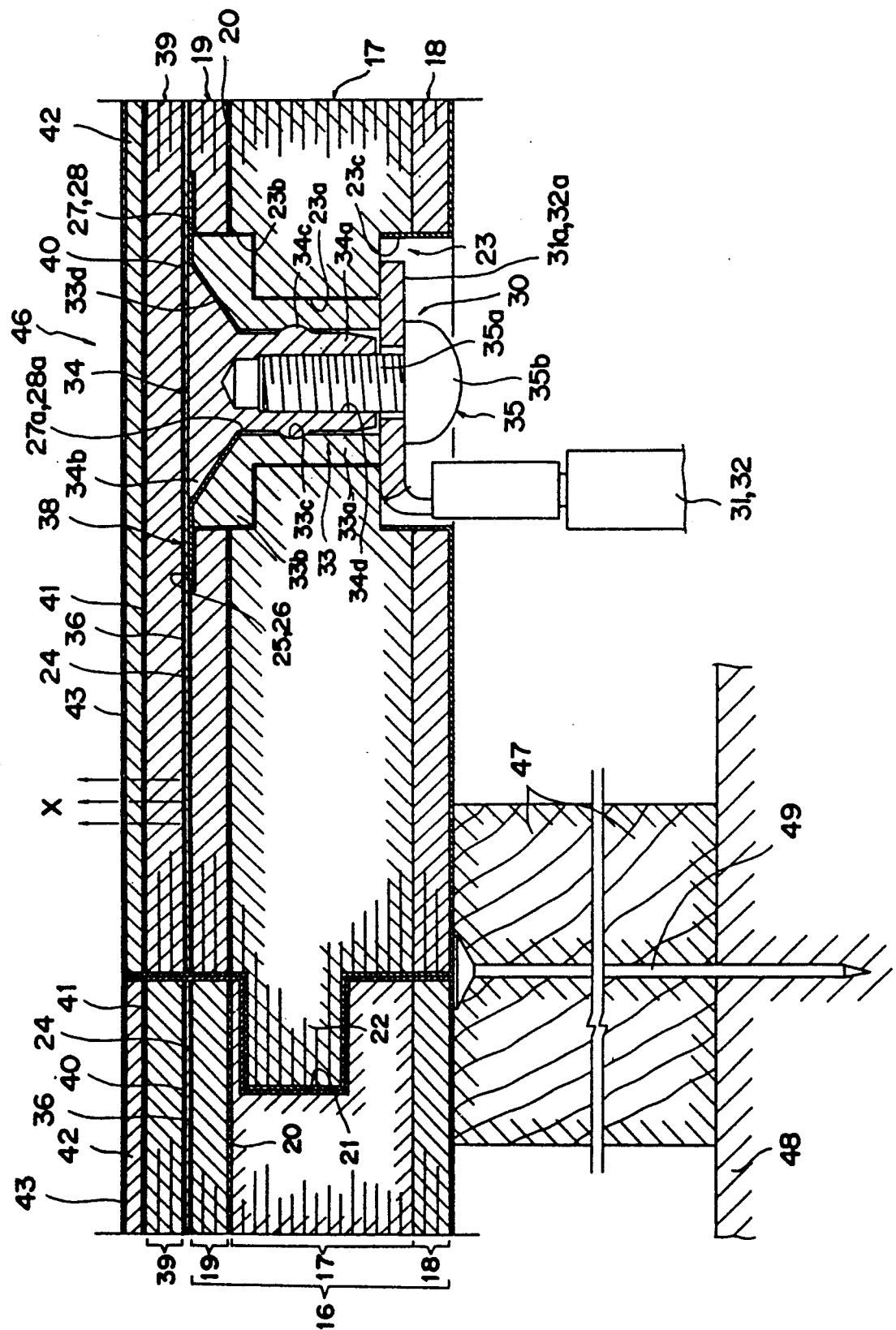
FIG. 5 is a longitudinally sectioned front view showing principal parts of the floor material with a heater contained therein.

With the heater device 1 having the above described construction, when an appointed voltage is applied between the desired pair of the belt shaped electrodes 3, 4, 5, 6, an electric current is flown between a pair of electrodes thereby the radiant body layer 7 generates a heat. That is to say, as shown in FIG. 3(A), lead wires 9, 12 on both sides of lead wires 9, 10, 11, 12 connected to the respective belt-shaped electrodes 3, 4, 6, 6 are connectable to a power source via a switch 13 while the lead wires 10, 11 on an inner side are connectable to the lead wires 12, 9 on both sides via switches 14, 15. When merely the switch 13 is turned on under the above described condition, as shown in FIG. 3(B), an electric current is flown between the belt-shaped electrodes 3, 6 on both sides thereby the heater device 1 generates a heat all over the width ($W_1$) thereof. In addition, when the switch 13 and one change-over switch 15 are turned on, as shown in FIG. 3(C), an electric current is flown between a pair of belt shaped electrodes 5, 6 closer to a side portion thereby the heater device 1 generates a heat merely over a width ($W_2$) closer to the side portion thereof. In addition, when the switch 13 and the other changeover switch 14 are turned on, an electric current is flown between a pair of belt-shaped electrodes 3, 4 closer to the other side portion of the heater device 1 thereby the heater device 1 generates a heat merely over a width ($W_3$) closer to the other side portion. And, when the switch 13 and both change-over switches 14, 15 are turned on, an electric current is flown between the belt-shaped electrodes 4, 5 on the inner side thereby the heater device 1 generates a heat merely over a width ($W_4$) in a central portion thereof.

A large number of heat device 1, which is constructed and operated in the above described manner, are stocked and shipped together with the bed plate and dressed sheet in compliance with the order. Then, there are some places where the standardized heater devices 1 can not be used depending upon the shape and area of the room in which they are installed but in these cases, as shown in FIG. 3(A), this can be solved by the cutting (E) between the belt-shaped electrodes 4, 5 in the direction of length, the cutting (F) all over the belt-shaped electrodes 3 to 6 in the direction of width or the combination of both cuttings (E), (F). Also the bed plate and dressed sheet can be cut in the same manner.

Next, the floor material with a heater contained therein according to the present invention is described.

Referring to FIGS. 4 to 7, reference numeral 17 designates a core formed by laminating a plurality of single plates so that their grain of wood may alternately meet a& right angles with each other. And, a back plywood 18 for preventing the bending is stuck to a back side of said core 17. In addition, the similar intermediate plywood 19 is stuck to a right side of the core 17 via a resin 20 such as epoxy resin, polyester resin and urethane resin. Resins, which are not hydrophilic and water proof, heat resistant and mothproof, are used as the resin 20. And, organic mercury, tin, copper and the like are added as the chemical insecticide and the resin 20 is apt to be set at normal temperature so as to eliminate an influenece by water. In addition, the resin 20 is interposed so as to be 0.1 to 0.5 mm in impregnated wall thickness and serves as the above described water-proof outer skin and adhesives. Said bed plate 16 formed by laminating in such the manner is provided with concave grooves 21 formed on one of a pair of edge portions and convex members 22 formed on the other of them. In addition, the bed plate 16 is provided with grooves 25, 26 formed in the vicinity of both ends in the direction of width on an upper surface side thereof all over the length thereof in the direction of length. And, said grooves 25, 26 are provided with a stepped through hole 23 comprising a small-diameter portion 23a at a center thereof and large-diameter portions 23b, 23c at both ends thereof formed at end portions thereof. This bed plate 16 is provided with a thermosetting resin layer 24 made of for example epoxy resins formed on a surface thereof. And, a pair of longitudinal belt-shaped electrodes 2?, 28 are positioned within said grooves 25 26 for example in the direction of width of the bed plate 16. In this time, the belt-shaped electrodes 27, 28 are disposed so as to extend in a direction B meeting at right angles with a direction A of the grain of wood of the surface plywood 19 and fixedly mounted via adhesives such as epoxy prepreg and hot melt sheet. These belt-shaped electrodes 27, 28 are 15 to 50 microns in thickness and in the case where they are formed of electrolytic copper, the surface is active, so that the adhesion is enhanced. And, the belt-shaped electrodes 27, 28 are connected to round terminals 31a, 32a of lead wires 31, 32 via connecting metal fittings 30. Said connecting metal fittings 30 comprises a mounting member 33 put in said stepped through hole 23 from a right surface side, a pin 84 drivable in said mounting member 33 from a right surface side and a vise 35 screwed on said pin 34 from a back surface side. That is to say, said mounting member 33 comprises a cylindrical portion 33a housed in said small-diameter portion 23a and a collar portion 33b housed in said large-diameter portion 23b on the right surface side, said cylindrical portion 33a being provided with a circular concave portion 33c formed on an inner surface thereof, and said collar portion 33b being provided with an inclined concave portion 33d opened outwards. Said pin 34 comprises an inner cylindrical portion 34a puttable in said cylindrical portion 33a and a head 34b puttable in said inclined concave portion 33d, said inner cylindrical portion 34a being provided with a circular convex portion 34c puttable in said circular concave portion 33c formed on an outer surface thereof and a female screw hole 34d opening on an outer surface side formed at a central portion thereof. The belt-shaped electrodes 27, 28 are held between the head 34b and the collar portion 33b by inserting the cylindrical portion 34a of the pin 34 into the holes 27a, 28a formed at end portions of the belt-shape d electrodes 27, 28 and driving it in the mounting member 33. The vise 35 inserted into said round terminals 31, 32 from below comprise s a screw portion 35a, which can be screwed in said female screw hole 34d, and an operating head 35b for holding the round terminals 31a, 32a between the mounting member 33 and a back surface end of the pin 34. A radiant body layer 36 is formed on the thermosetting resin layer 24 and an upper surface of the belt-shaped electrodes 27, 28 with said intermediate plywood 19 as a substratum, said radiant body layer 36 being formed of a film made of a mixture comprising for example granular and powdery carbon, granular and powdery electrically conductive ores, granular and powdery semiconductive ceramics, resins, metal oxides, zirconia and the like. In this time, the radiant body layer 36 is formed in such the pattern that voids 37 exist at many places in the direction of length of the belt shaped electrodes 27, 28 between both belt shaped electrodes 27, 28. Said granular powdery carbon, metal oxides and zirconia radiate and reflect far infrared rays. These are all or partically added. These belt-shaped electrodes 27, 28, the radiant body layer 36 and the like form the heater device 38 radiating far-infrared rays. And, a surface plywood 39 formed of for example a sun tree wood for covering a surface of the heater device 38 is laminated on the radiant body layer 36 via a thermosetting resin layer 40. In this time, the thermosetting resin layer 24 is combined with the thermosetting resin layer 40 through the voids 37 thereby enhancing the laminating strength. A dressed or cover sheet 42 is laminated on said surface plywood 39 via an insulating resin layer 41. Said dressed sheet 42 is formed of for example a thin plate of wood, a thin plate made of resins, papers and the like. A shell layer 43 formed of a resin layer radiating far-infrared rays obtained by adding far-infrared ray radiating materials, such as zirconia and metal oxides, to the same kind of resin as said resins 20 is formed all over the exposed surface of said bed plate 16, dressed sheet and the like. Thus, a floor material 46 with a heater contained therein is formed.

In the production of such the floor material 46 with a heater contained therein, at first the back surface plywood 18 is laminated on the back side of the core 17 formed by laminating a plurality of wooden single plates and the intermediate plywood 19 is laminated on the right side of the core 17 via the resin 20 to form the bed plate 16. Then, the grooves 25, 26 and the stepped through hole 23 are formed at the appointed places of the intermediate plate 19. And, the thermosetting resin layer 24 is laminated for example by the coating using a roller or the spraying. In this time, the thermosetting resin layer 24 is formed on the grain of wood 19a of the intermediate plywood 19 but the grooves of the grain of wood 19a are not completely filled up but the similar grain of wood 19a is remained. Subsequently, the mounting member 88 is put in the stepped through hole 23 and fixed with said thermosetting resin layer 24 as adhesives. And, the belt-shaped electrodes 27, 28 are disposed in the grooves 25, 26 and fixed via adhesives so that the holes 27a, 28a may coincide with the through portion of the mounting member 33 and their direction of length may be orientated in the direction B meeting at right angles with the direction A of the grain of wood. Next, the inner cylindrical portion 34a of the pin 34 is driven in so as to pass through the cylindrical portion 33a from the holes 27a, 28a. Thus, the circular convex portion 34c is put in the circular concave portion 33c thereby both portions 33, 34 are strongly joined together and the belt shaped electrodes 27, 28 are strongly held between the inclined concave portion 33d and the head 34b. And, the radiant body layer 36 is laminated by the coating and the spraying. In this time, said voids 37 are formed. The surface plywood 39 is laminated on the radiant body layer 36 via the thermosetting resin layer 40 and the insulating resin layer 41 is laminated on the surface plywood 39 by the coating and the spraying and then the dressed sheet 42 is constructed followed by forming the shell layer 43 by the coating and the spraying.

The floor materials 46 with a heater contained therein, which have been constructed in such the manner, are stood in a row on the floor joints 47 with putting the convex members 22 in the concave portions 21. And, the round terminals 31a, 32a positioned at the large-diameter portion 23c on the back surface side is fixedly tightened by means of the operating head 35b of the vise 35 by screwing the screw portion 35a in the female screw hole 34d. Reference numeral 48 designates a support wood and reference numeral 49 designates a nail.

In the use of the floor material 46 with a heater contained therein, the appointed voltage is applied between the belt-shaped electrodes 27, 28 via the control equipment. Thereupon, an electric current is flown in the direction A of the grain of wood all over the range of the radiant body layer 36 to generate a heat all over the surface of the radiant body layer 36. The generated heat is transmitted to the surface plywood 39, the insulating resin layer 41, the dressed sheet 42 and the shell layer 43 to uniformly heat the floor material 46 with a heater contained therein all over the surface. In this time, also the bed plate 16 is heated but the water-proof seal is effected by the shell layer 43, so thai the aqueous ingredients do not escape.

Under such the using condition, the heater device 38 radiates a far-infrared energy in addition to a thermal energy. That is to say, far-infrared rays X radiated from the upper surface side of the heater device 38 are transmitted through the surface plywood 39, the insulating resin layer 41, the dressed sheet 42 and the shell layer 43 and then radiated in the room, where far-infrared rays act upon water, so that when a person with a large quantity of water enters the room, the human body is heated by said reaction. Accordingly, the human body can be sufficiently heated with suppressing the temperature-rise due to the thermal energy from the heater device 38. That is to say, the human body can be sufficiently heated even though it feels chilly to some extent in the room.

In addition, an energy of a wood of each single plate its own can be released by applying zirconia (minute powdery) to the surface of the dressed sheet 42 by the use of urethane.

Figure 6:
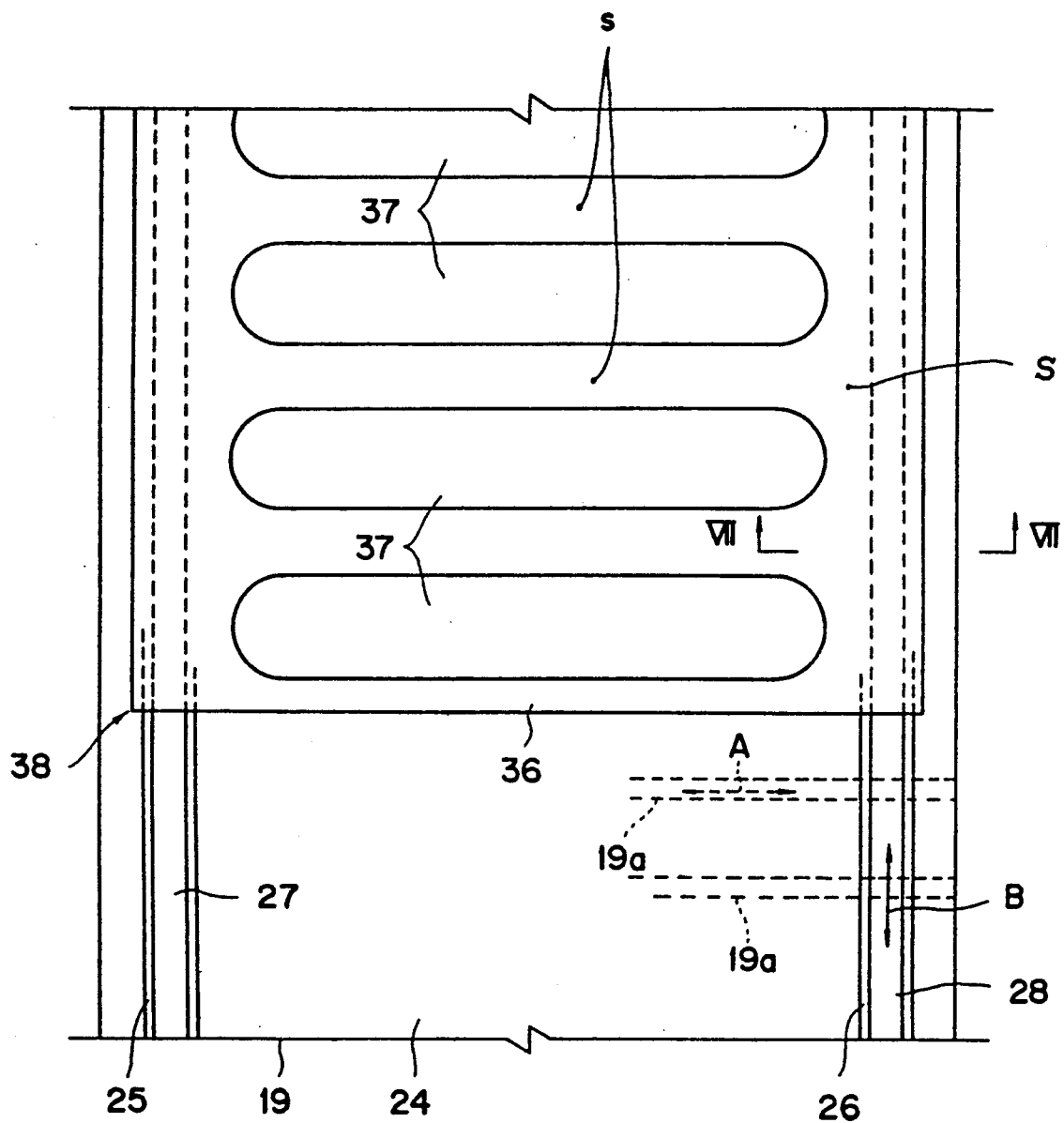
FIG. 6 is a plan view showing the principal parts of the floor material with a heater contained therein.
Figure 7:
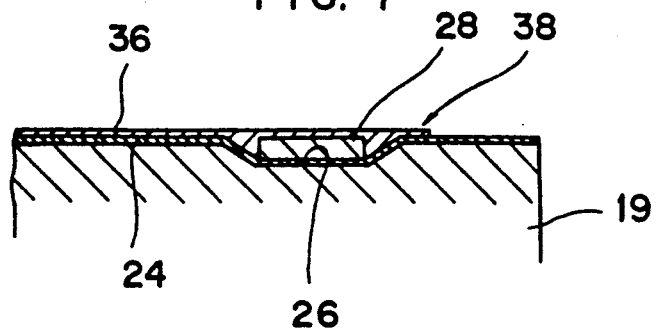
FIG. 7 is a sectional view of FIG. 6 taken along the line VII—VII thereof.
Figure 8:
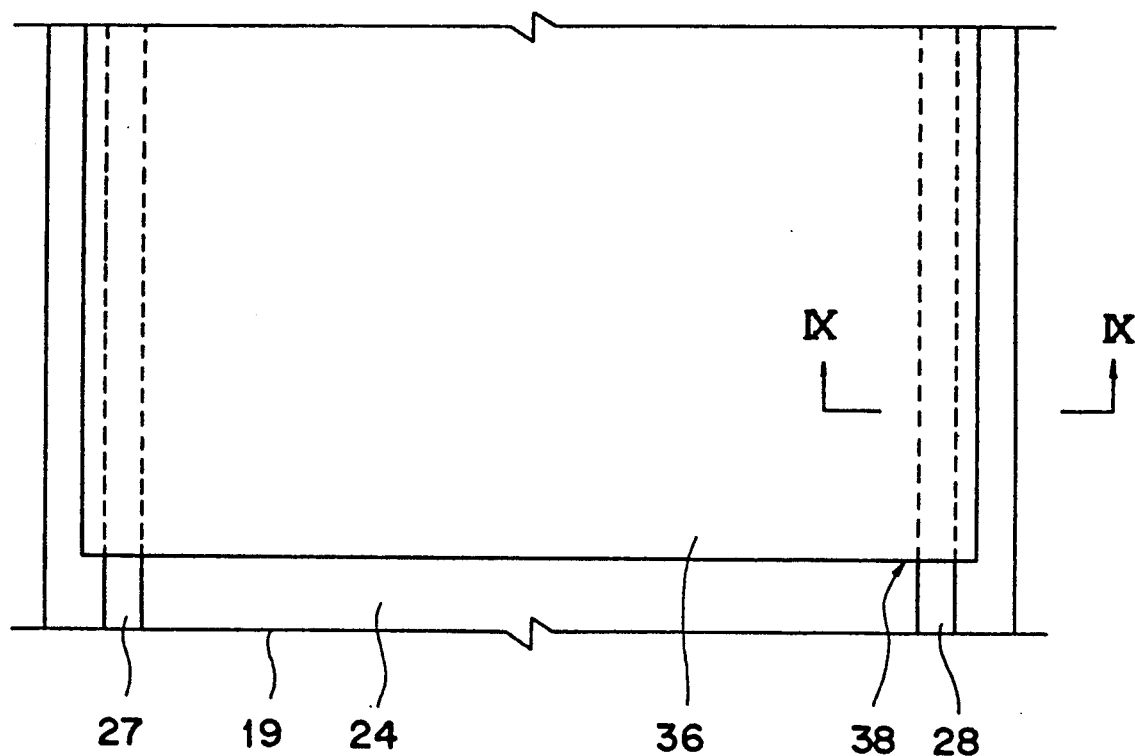
FIG. 8 is a plan view showing the principal parts for comparison in the present invention.
Figure 9:
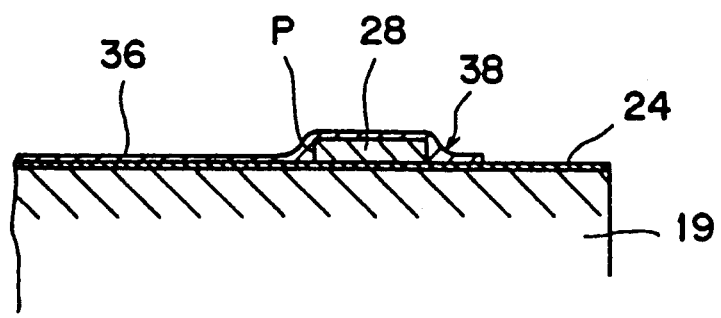
FIG. 9 is a sectional view of FIG. 8 taken along the line IX—IX thereof.

When the grooves 25, 26 are formed in the intermediate plate 19 and the belt-shaped electrodes 27, 28 are disposed in the grooves 25, 26 and the radiant body layer 36 is laminated with producing the voids 37, as above described, the cracks can be prevented from generating at the weak points of the radiant body layer 36. That is to say, as shown in for example FIGS. 8 and 9, in the case where the belt-shaped electrodes 27, 28 are projectedly disposed on the upper surface side of the intermediate plywood 19 and the radiant body layer 36 is laminated all over the surfaces of the plywood 19 and the belt shaped electrodes 27, 28, the joint portions of the belt shaped electrodes 27, 28 and the radiant body layer 36 become weak points P from which the cracks are generated with a lapse of the using time. Thus, the weak points P are broken to short circuit and produce an arc thereby scorching the plywoods 19, 39. On the contrary, in the above described preferred embodiment, as shown in FIGS. 6 and 7, the area s, where the voids 37 exist, of the radiant body layer 36 is smaller than the jointing area S of the jointing portions, so that the cracks are generated from the portions, where the voids exist, with a lapse of the using time. The breakage due to these cracks does not lead to the short-circuit and the like because of the same material and even though no heat is generated at the broken portions, the heat-generating effect is not reduced so much as a whole.

In the above described preferred embodiment, the bed plate 16 can be prevented from being bent by laminating the back surface plywood 18 and the intermediate plywood 19 on the core 17 to construct the bed plate 16 thereby protecting the floor material 46 with a heater contained therein and improving the useful life time of the floor material 46. That is to say, for example merely with the core 17, breaks are produced at the jointing portions by the thermal deformation of the respective single bodies during the temperature-rise. And, a shearing thermal stress is enhanced at these breaks to generate cracks in the radiant body layer 36. On the contrary, in the case where the bed plate 16, which does not produce the bending, as above used, the shearing thermal stress is almost uniform all over the surface of the bed plate 16 thereby preventing the cracks from being generated.

In addition, both plywoods 18, 19 may be replaced by a fiber reinforced resin plate. In this case, the heat resistance can be enhanced.

Furthermore, in the above described preferred embodiment, the radiant body layer 36 is laminated by &he coating and the spraying. But, in this case, the surface of the bed plate 16 is uneven due to the grain of wood, so that scratchy portions are produced in the direction meeting at right angles with the direction of grain of wood to stop an electric current flowing these scratchy portions while the continuous flow of electric current is maintained by the concave grooves in the direction of grain of wood. And, when a voltage is applied between the belt-shaped electrodes, an electric current is always smoothly and surely flown along this direction of grain of wood.

According to the present invention, resins can be interposed between the single plates in the formation of the core 17 by laminating a plurality of single plates. The resins, which are used here, are same as said resin 20, which is interposed between the intermediate plywood 19 and the core 17, in kind and characteristics and used for the same object and by the same method as the resin in 20. With such the construction, the aqueous ingredients can be inside of the single plates and the cutting surfaces in cooperation with the existence of said shell layer 43. Thus, not only the aqueous ingredients contained in the single plates, that is, the bed plate, can be maintained under the produced condition to prevent the shrinkage from being generated and to prevent the creaks due to the production of the gaps from being generated but also the edge portion of the dressed sheet can be prevented from being gotten turned up. In addition, not only the surface strength but also the laminating strength can be enhanced by the resin covering all over the exposed surface.

Besides, according to the present invention, the surface plywood 39 and the intermediate plywood 19, which are laminated up and down on the heater device 38, can be formed of merely one sheet and other single plates and the like can be formed of a plurality of narrow single plates put side by side sideways. Thus, the protection and the useful life time of the floor material 46 with a heater contained therein can be improved. That is to say, when the surface ply wood 39 is not formed of merely one sheet but formed of a plurality of single plates put side by side, the breaks are produced at the jointing portions by the thermal deformation of the respective single bodies during the temperature-rise. And, the shearing thermal stress is enhanced at these breaks to produce the cracks in the radiant body layer 36. On the contrary, when the surface plywood 39 and the intermediate plywood 19 are formed of merely one sheet, the shearing thermal stress can be almost uniformized all over the surface to prevent the cracks from being generated.

Figure 10:
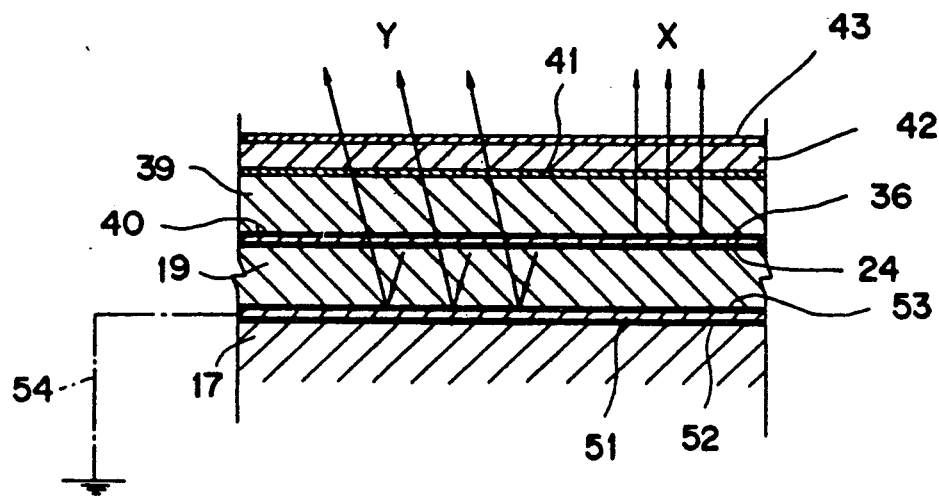
FIG. 10 is a longitudinally sectioned front view showing principal parts of another preferred embodiment.

FIG. 10 shows another preferred embodiment in which the far-infrared ray reflecting plate 51 is provided. That is to say, the far infrared ray reflecting plate 51 is formed of aluminum and the like in the shape of a film and interposed between for example the core 17 and the intermediate plywood 19. When they are laminated, the insulating resin layers 52, 53 are interposed.

According to this preferred embodiment, the far-infrared rays X radiated from the upper surface side show the same behavior as above described while the far-infrared rays y radiated from the lower surface side are transmitted through the intermediate plywood 19 and then come into collision with the far infrared ray reflecting plate 51 to be reflected by the reflecting plate 51 and then transmitted through the intermediate plywood 19, the heater device 38, the surface plywood 39 and the like followed by radiating in the room. Thus, the effect by far-infrared rays can be improved. In addition, it is effective for the insulation to lead an earth 54 from the reflecting plate 51.

Figure 11:
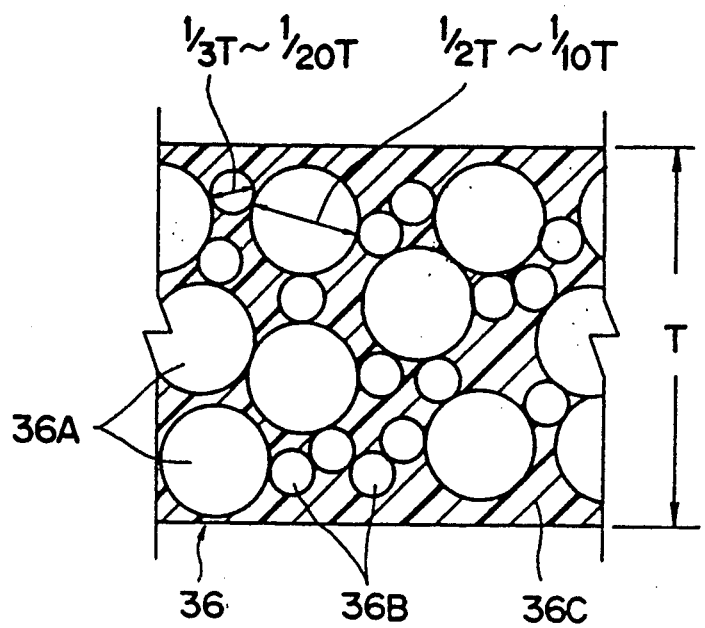
FIGS. 11 and 12 are diagrams showing principal parts.
Figure 12:
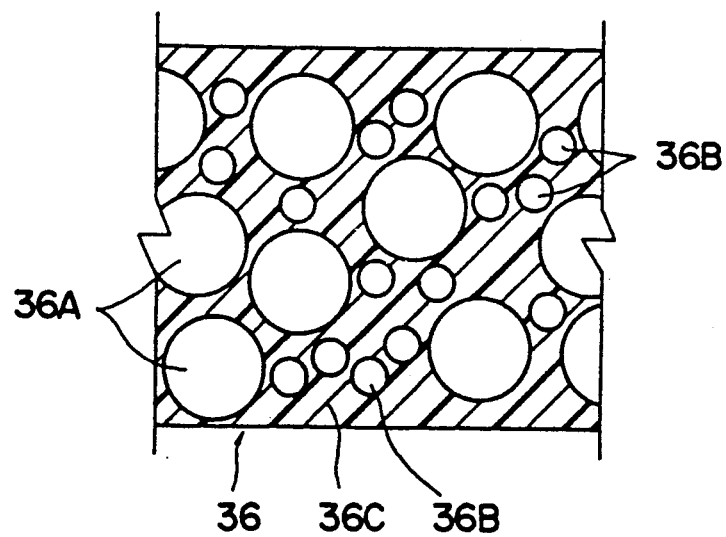

FIGS. 11 and 12 show other preferred embodiments of the radiant body layer according to the present invention. This radiant body layer 36 is formed of a mixture comprising large-diameter carbons 36A and small-diameter carbons 36B, which are made of graphite and the like, and a resin 36C in the shape of a film and an expanding material showing a thermal expansion larger than that of the resin 36C is added in the resin 36C. Provided that a thickness of the radiant body layer 36 is T, a particle diameter of the large-diameter carbon 36A is $\frac{1}{2}$ T to 1/10 T while that of the small-diameter carbon 36B is $\frac{1}{2}$ T to 1/20 T. And, a mixture ratio of the large-diameter carbons 36A to the small-diameter carbons 36B is as follows:

36A:36B = 10 to 40%; 90 to 60%

Polyester resins, eopxy resins, acrylic resins, urethane resins and the like are used as said resin 36C. Acrylic resins, styrene resins and the like are used as the expanding material formed of resins having a thermal expansion coefficient larger than that of the resin 36C. And, a mixture ratio of the resin 36C to the expanding material is as follows:

Resin:Expanding material = 90 to 60%:10 to 40%

Said carbons 36A, 36B radiate and reflect far-infrared rays.

In the case where such the radiant body layer 36 is used, before the appointed voltage is applied between the belt shaped electrodes 27, 28, as above described, in the radiant body layer 36 respective carbon 36A, 36B is brought into contact to each other, as shown in FIG. 11, thereby an electric current is flown between carbon 36A and 36B to generate a heat and radiate far-infrared rays. And, if the temperature of the heater device 38 is risen with a lapse of using time, carbon 36A, 36B is gradually shrunk due to characteristics thereof, so that the jointing portions are separated in turn, as shown in FIG. 12, and finally an electric current is stopped to flow to be automatically turned off. Upon turning off an electric current, the temperature of the heater device 38 is descended, so that carbon 36A, 36B is gradually expanded thereby the heater device 38 is automatically turned on due to an increase of the jointing portions. In this time, the resin 36C, which serves also as a binder for a group of carbon 36A, 36B, is easily expanded during the temperature-rise, said expansion of the resin 36C being promoted by the thermal expansion of the expanding material added. Thus, carbon 36A, 36B can be smoothly expanded and shrunken. As above described, the heater device 38 can be automatically turned off when overheated to improve the safety.

With the floor material with a heater contained therein according to the present invention, even though an electric current does not flow at some places due to some circumstances, troubles and the like when being used, an electric current is flown in the great part of the remaining range to generate a heat and also said some places are compensated. As a result, the floor material can be heated all over the surface thereof without any troubles.

In addition, in the installation of the floor material 46 with a heater contained therein in the room, it must be adjusted to the room in size. However, in this case, the floor material 46 with a heater contained therein is cut to the desired size in the direction of length under the condition that both connecting metal fittings 30 are left.

In this time, said shell layer 43 is formed on the cut surface by the coating.

In addition, when the heater device 38, which radiates far infrared-rays, as described in the above described preferred embodiment, is installed, the far-infrared rays X, which are radiated from the upper surface side of the heater device 38, can be transmitted through &he dressed sheet 42 and the like and then radiated in the room. Accordingly, the persons within the room are heated by the action of the far infrared-rays X. That is to say, the temperature-rise by the thermal energy from the heater device 38 is suppressed and thus the economical heating can be achieved and the sufficient heating effect can be achieved in addition, the far-infrared rays y, which are radiated from the lower surface side, are reflected by the reflecting plate 51 and then radiated in the room by providing the reflecting plate 51 thereby almost all far infrared-rays from the heater device 38 can be radiated in the room.

As above described, the heater device according to the present invention can be effectively used for the floor material with a heater contained therein but it can be advantageously utilized also for the following uses.

That is to say, in the production of chairs and desks having the heating function, the heater device or the floor material with a heater contained therein radiating far-infrared rays according to the present invention is provided in a pedal attached under a desk and a seat and a back of a chair depending upon the object.

Furthermore, in the production of a heating device used as a household heating box for drying tablewares and storing foodstuffs, a sauna, a drier for the washings and the like, the heater device or the floor material with a heater contained therein radiating far infrared rays according to the present invention is provided in one wall portion of the heating device and a far infrared-ray reflecting plate is provided in other wall portions.

Or, in the production of a table device capable of heat insulating foodstuffs on a table, the heater device or the floor material with a heater contained therein radiating far-infrared rays according to the present invention is provided in the upper portion of the table and the far-infrared ray reflecting plate facing to the heater device or the floor material with a heater contained therein is provided above the table.

As above described, the heater device and the floor material with a heater contained therein according to the present invention can be widely used.

What is claimed is:

1. A heater device used for a floor material and the like comprising,
    an insulating sheet,
    a plurality of belt-shaped electrodes arranged side by side at intervals on said insulating sheet,
    a plastic radiant body layer formed on the insulating sheet and said belt-shaped electrodes,
    an insulating layer formed on said radiant body layer, and
    means for supplying an electric current between a selected pair of said electrodes.

2. A floor material with a heater contained therein comprising,
    a bed plate,
    a first resin layer formed on said bed plate,
    a pair of belt-shaped electrodes provided on said first resin layer with an interval therebetween,
    a radiant body layer formed on said first resin layer and said belt-shaped electrodes,
    a second resin layer formed on said radiant body layer, and
    a cover sheet provided on said second resin layer.

3. A floor material as set forth in claim 2, wherein said bed plate is formed of a plurality of single plates laminated with resins interposed between said single plates and a third resin layer is formed on an exposed surface of the bed plate and the cover sheet.

4. A floor material as set forth in claim 2, wherein the bed plate is provided with grooves formed on an upper surface thereof for accommodating the belt-shaped electrodes, the belt-shaped electrodes being disposed in said grooves, and the radiant body layer being provided with a plurality of voids formed in the direction of length of the belt-shaped electrodes between both belt-shaped electrodes.

5. A floor material with a heater contained therein comprising,
    a bed plate formed by laminating a plurality of wooden single plates via a piece of fan-infrared ray reflecting plate interposed therein,
    a plate type heater device capable of radiating far-infrared rays, having a radiant body layer and disposed on said bed plate, and
    a cover sheet provided on said heater device.

6. A floor material as set forth in claim 5, further comprising a resin layer formed on said cover sheet, said resin layer radiating far-infrared rays.

7. A floor material as set forth in claim 5, wherein said radiant body layer is formed of a mixture comprising large-diameter carbons, small diameter carbons and a resin and an expanding material having a thermal expansion coefficient larger than that of said resin is added in the resin.

* * * * *